US011720603B2

(12) United States Patent
Sim et al.

(10) Patent No.: US 11,720,603 B2
(45) Date of Patent: *Aug. 8, 2023

(54) USER INTERFACES BASED ON PRE-CLASSIFIED DATA SETS

(71) Applicant: INTUIT INC., Mountain View, CA (US)

(72) Inventors: Joanna Sim, Mountain View, CA (US); Hannah Hudson, Mountain View, CA (US); Rit Mishra, Mountain View, CA (US); Justin Calles, Mountain View, CA (US); Prasannavenkatesh Chandrasekar, Mountain View, CA (US); Carly Wood, Mountain View, CA (US); Grace Wu, Mountain View, CA (US); Susrutha Gongalla, Mountain View, CA (US); Heidi Yang, Mountain View, CA (US); Gerald Carvalho, Mountain View, CA (US); Justin Li, Mountain View, CA (US); Catherine Cacheris, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/141,451

(22) Filed: Jan. 5, 2021

(65) Prior Publication Data

US 2021/0124769 A1    Apr. 29, 2021

Related U.S. Application Data

(63) Continuation of application No. 15/955,345, filed on Apr. 17, 2018, now Pat. No. 10,909,147.

(51) Int. Cl.
*G06F 16/00* (2019.01)
*G06F 16/28* (2019.01)
(Continued)

(52) U.S. Cl.
CPC .......... *G06F 16/287* (2019.01); *G06F 3/0485* (2013.01); *G06N 7/01* (2023.01)

(58) Field of Classification Search
CPC ................... G06F 16/22; G06F 9/5005; G06F 2209/5011; G06F 16/345; G06F 16/287;
(Continued)

(56) References Cited

U.S. PATENT DOCUMENTS 9,060,062 B1   6/2015  Madahar et al.
2007/0055597 A1   3/2007  Patel et al.
(Continued)

FOREIGN PATENT DOCUMENTS

WO    2011026511 A1    3/2011

OTHER PUBLICATIONS

Seneviratne et al., "Predicting UserTraits From a Snapshot of Apps Installed on a Smartphone," Mobile Computing and Communications Review, vol. 18, No. 2, Apr. 2014, pp. 1-8. (Year: 2014).*

(Continued)

*Primary Examiner* — Cheryl Lewis
(74) *Attorney, Agent, or Firm* — Patterson + Sheridan, LLP

(57) ABSTRACT

Aspects of the present disclosure provide techniques for displaying reduced data sets based on pre-classification of a larger data set. Embodiments include receiving a plurality of activity records describing a plurality of activities associated with the user. Embodiments further include grouping the plurality of activities into one or more pre-classified data sets based on the plurality of activity records. Embodiments (Continued)

further include providing the user with a summary of a pre-classified data set of the one or more pre-classified data sets via a user interface. Embodiments further include providing the user, via the user interface, with a user interface element that allows the user to provide input related to the pre-classified data set based on the summary. Embodiments further include receiving input from the user via the user interface, the input relating to the pre-classified data set.

20 Claims, 7 Drawing Sheets

(51) Int. Cl.
    *G06F 3/0485*     (2022.01)
    *G06N 7/01*     (2023.01)

(58) Field of Classification Search
    CPC .... G06F 3/0485; G06F 16/353; G06F 16/358; G06Q 40/123
    See application file for complete search history.

(56) References Cited

U.S. PATENT DOCUMENTS

| | | |
|---|---|---|
| 2008/0262959 A1 | 10/2008 | Tupper et al. |
| 2012/0130630 A1 | 5/2012 | Tang et al. |
| 2016/0125317 A1 | 5/2016 | Benjamin |
| 2017/0300184 A1 | 10/2017 | Calles et al. |
| 2018/0302302 A1 | 10/2018 | Doggett et al. |
| 2019/0186919 A1 | 6/2019 | Lush et al. |

OTHER PUBLICATIONS

Muhammad Mahbubur Rahman, "Mining Social Data to Extract Intellectual Knowledge," Social and Information Networks, Information Journal of Intelligent System and Applications (IJISA), vol. 4, No. 10, pp. 15-24, 2012. (Year: 2012).*

International Search Report/Written Opinion issued to PCT/US2019/025140 dated Aug. 1, 2019.

* cited by examiner

USER INTERFACES BASED ON PRE-CLASSIFIED DATA SETS

CROSS-REFERENCE TO RELATED APPLICATIONS

This Application is a continuation of and hereby claims priority under 35 U.S.C. § 120 to pending U.S. patent application Ser. No. 15/955,345, filed on Apr. 17, 2018, the contents of which are incorporated herein by reference in their entirety.

INTRODUCTION

Aspects of the present disclosure generally relate to more efficient methods of presenting data to users through graphical user interfaces. In particular, embodiments of the present disclosure involve pre-classifying data in order to present reduced sets of data to users for interaction.

BACKGROUND

Digital data is ubiquitous in modern day life. It is captured, stored, analyzed, and presented for an increasing number of purposes. For every conceivable need, there is an application or "app" for that.

The diversity of available data sources and ability to exploit that data to many ends has enabled remarkable capabilities for anyone with a computing device. Difficult tasks such as tracking personal finances across myriad financial institutions, business accounting, tax preparation, and many others used to be the exclusive province of trained professionals, but now are available to anyone with an appropriate application. In fact, many of these otherwise complicated tasks are only a smart-device away.

The cost of all this capability, however, is the sheer amount of data an average person interacts with on a daily basis. The glut of digital data confronting average individuals is becoming, if it has not already become, overwhelming. This is particularly true when users have so many different ways to interact with applications and data in a given day, such as on a computer, on a smartphone, on a tablet, and the like. Users expect the "experience" to be available, consistent, and convenient across all of these types of devices, despite the devices having very different inherent capabilities, such as screen size.

Unfortunately, while the capabilities of applications have expanded broadly, the way in which users interact with applications and data has not kept pace. In many cases, this means that a perfectly competent application may nevertheless be abandoned by a user because the amount of data to sift through in the application is simply overwhelming. For example, a user trying to separate business expenses from personal expenses may be flummoxed or even irritated by the process of sifting through transactions from a plethora of financial accounts to manually classify transactions. As such, a user may revert to paying a trained professional to perform the task just to avoid the task altogether.

Accordingly, what is needed are data classification and presentation capabilities on par with the diverse set of functional capabilities already available in applications. For example, better back-end data classification processing coupled with more efficient user interfaces taking advantage of that processing are needed so that users may exploit digital data to their ends, rather than being overwhelmed by it.

BRIEF SUMMARY

Certain embodiments provide a computer-implemented method for displaying reduced data sets based on pre-classification of larger data sets. The method generally includes receiving a plurality of activity records describing a plurality of activities associated with the user. The method further includes grouping the plurality of activities into one or more pre-classified data sets based on the plurality of activity records. The method further includes providing the user with a summary of a pre-classified data set of the one or more pre-classified data sets via a user interface. The method further includes providing the user, via the user interface, with a user interface element that allows the user to categorize all activities in the pre-classified data set together based on the summary. The method further includes receiving input from the user via the user interface, wherein the input assigns a category to all activities in the pre-classified data set together based on the summary.

Other embodiments provide a non-transitory computer-readable medium comprising instructions that, when executed by one or more processors, cause the one or more processors to perform an operation for displaying reduced data sets based on pre-classification of larger data sets. The operation generally includes receiving a plurality of activity records describing a plurality of activities associated with the user. The operation further includes grouping the plurality of activities into one or more pre-classified data sets based on the plurality of activity records. The operation further includes providing the user with a summary of a pre-classified data set of the one or more pre-classified data sets via a user interface. The operation further includes providing the user, via the user interface, with a user interface element that allows the user to categorize all activities in the pre-classified data set together based on the summary. The operation further includes receiving input from the user via the user interface, wherein the input assigns a category to all activities in the pre-classified data set together based on the summary.

Other embodiments provide a system comprising a processor and a non-transitory computer-readable medium storing instructions that, when executed by one or more processors, cause the one or more processors to perform an operation for displaying reduced data sets based on pre-classification of larger data sets. The operation generally includes receiving a plurality of activity records describing a plurality of activities associated with the user. The operation further includes grouping the plurality of activities into one or more pre-classified data sets based on the plurality of activity records. The operation further includes providing the user with a summary of a pre-classified data set of the one or more pre-classified data sets via a user interface. The operation further includes providing the user, via the user interface, with a user interface element that allows the user to categorize all activities in the pre-classified data set together based on the summary. The operation further includes receiving input from the user via the user interface, wherein the input assigns a category to all activities in the pre-classified data set together based on the summary.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
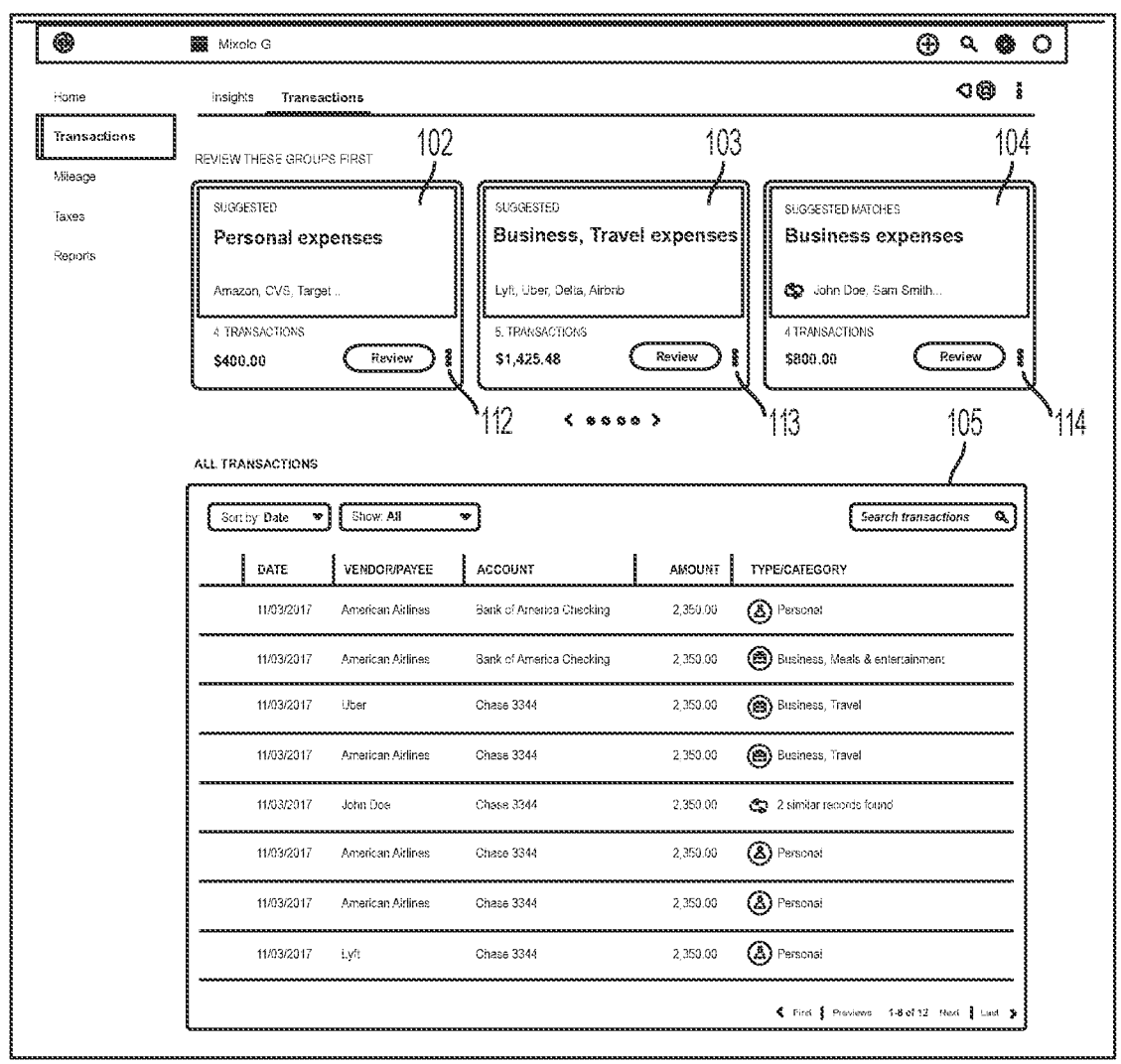
FIGS. 1A-C depict aspects of an example user interface for providing users with reduced data sets based on pre-classification of larger data sets.

Aspects of the present disclosure provide apparatuses, methods, processing systems, and computer readable mediums for presenting pre-classified data in an efficient user interface.

An application may implement pre-classification of data and provide an efficient user interface that takes advantage of the pre-classifications in order to improve users' ability to interact with large data sets. Pre-classification of data may enable groups or "buckets" of data to be presented to a user through complementary user interface elements.

For example, rather than providing a single, long list of financial transactions for a user to sort through to categorize transactions one-at-a-time, a personal finance managing application may pre-classify financial transactions and present like transactions to the user for quick disposition. These smart "groups" or "buckets" enable a user to efficiently categorize large amounts of transactions without having to apply any manual sorting, grouping, or the like.

The pre-classification of data may, in some instances, be based on back-end processing, such as by using predictive models. Certain embodiments of the present disclosure involve training a predictive model based on historical data in order to predict categories of user data. The predictive model may be based on, for example, a clustering model, a linear model, a neural network, a decision tree-based model, or the like, which is trained using a set of input variables (e.g., historical data) and an output variable (e.g., categorized historical data). Once trained, the predictive model may be used to predict an output (e.g., a predicted category) based on input variables (e.g., new user data). Historical data may include data from a particular user or from a plurality of users. In some embodiments, at least a subset of the historical data may comprise user-provided classification data or "ground truth labels", such as category data and/or descriptive text that is related to the activity records (e.g., describing a purpose of a trip). For example, users may provide input through client devices that capture activity data. The predictive model may be used in certain embodiments to predict a category of each of a plurality of activities of a user, and the activities may be grouped into pre-classified data sets according to predicted categories.

In other embodiments, activities of a user may be grouped into pre-classified data sets based on shared attributes. For example, all trips that share a common destination location may be grouped into a single pre-classified data set. Attributes of a user's activities may be determined, for example, based on activity records related to the activities, user data of the user, and the like.

After activities have been pre-classified (e.g., into one or more smart buckets or pre-classified data sets), the one or more pre-classified data sets may be presented to the user via a user interface associated with an application running on a user's client device so that the user may assign categories to the activities based on the pre-classified data sets.

In some embodiments, a summary of each pre-classified data set may be presented to the user. The user may be able to categorize all activities in the pre-classified data set together based on the summary without viewing each individual activity in the pre-classified data set, or the user may choose to view all activities in the pre-classified data set for a more thorough review.

For example, if the pre-classified data set comprises a plurality of activities sharing a common attribute (e.g., all trips to a particular location), the user may be provided with a control to categorize the plurality of activities as "business" or "personal" (or other categories) based on a summary of the pre-classified data set. Alternatively, the user may choose to view each of the plurality of activities and assign categories to each individually or together.

In another example, a pre-classified data set comprises a plurality of activities that share a common predicted category (e.g., all transactions with a predicted category of business travel). The user may be provided with a control to confirm the predicted category of the plurality of activities or to select a different category for the plurality of activities based on the summary. Alternatively, the user may choose to view each of the plurality of activities and assign categories to each individually or together.

Different user interfaces may be provided for different types of client devices in order to provide an efficient user interface for categorizing activities based on pre-classified data sets. For example, a user interface provided to a user of a laptop or desktop computer may have larger components and include more detail in summaries of pre-classified data sets than would a user interface provided to a user of a mobile device. For example, the pre-classified data sets may have more items, or may show more items by default, on a device with a larger screen. In some cases, the same type of consideration may be made for other aspects of a screen, such as the pixel density, orientation, or the like.

It is noted that that the term "pre-classification" as used herein may include pre-categorization (e.g., predicting categories), but may also include grouping that is not based on categories, such as grouping based on shared attributes (e.g., trips that share a destination location may be grouped together into a pre-classified data set). Pre-classification generally refers to classification of data that takes place before the data is presented to a user for review and categorization. The term "categorization" as used herein generally refers to assigning a category to data (e.g., categorizing an activity as either business or personal), and is generally performed by a user (e.g., via input to a user interface that displays pre-classified data sets).

The category of an activity may affect its treatment with respect to a user's tax liability and/or financial management. Thus, in order to predict the user's tax liability, billable expenses, and/or the like more accurately, it is important that the activities are categorized correctly. For example, a self-employed user who runs a business may have two cars, one used to conduct business operations and another for personal use. In such an example, the user may pay for gas using a credit card that is used for both personal and business expenses. When calculating the user's business expenses to determine the business's tax liability, for example, it is important to determine whether the expense related to the gas payment is a personal or a business expense. As such, embodiments of the present disclosure allow users to more efficiently review and categorize activities.

The term "activity" as used herein generally refers to an action in which a user participated, such as a trip or a transaction. "Transaction" generally refers to an exchange in which a user participated, such as a financial transaction between the user and one or more counter-parties.

Techniques described herein constitute an improvement with respect to conventional industry practices, as they provide pre-classification coupled with an improved user interface to allow for more efficient and convenient categorization of activities by users. Grouping activities into pre-classified data sets (e.g., based on shared attributes and/or predicted categories) and providing the pre-classified data set to a user via a user interface for categorization of the activities improves the categorization process. Techniques described herein include a specific manner of displaying a limited set of information to the user, rather than using conventional user interface methods to display as much data as possible (e.g., in a continuous list). Allowing a user to categorize a plurality of activities based, for example, on summaries of pre-classified data sets comprising the plurality of activities, or by reviewing the plurality of activities in an organized fashion based on the pre-classified data sets, improves the efficiency of using an electronic device to categorize data. Consequently, users may be more inclined to use such categorization features, whereas before users would simply ignore the capability because of the overwhelming size of the task. As another benefit, such improved interfaces may lead to long-term user engagement with an application, rather than abandoning the application.

Example User Interfaces

FIG. 1A depicts aspects of an example user interface view 100A for providing users with reduced data sets based on pre-classification of larger data sets. User interface view 100A comprises an screen or "view" that is presented to a user on a display of a client device. For example, user interface view 100A may be a view within a financial services application executing on a user device.

User interface view 100A includes summaries 102, 103, and 104 of pre-classified data sets (e.g., smart buckets) that comprise transactions to be categorized by a user. Summary 102 includes a data set of transactions that are pre-classified as "personal expenses" from "Amazon", "CVS", and "Target" in a total amount of $400. Summary 103 includes a data set of transactions that are pre-classified as "business, travel expenses" from "Lyft", "Uber", "Delta", and "Airbnb" in a total amount of $1425.48. Summary 104 includes a data set of transactions that are pre-classified as "business expenses" from "John Doe" and "Sam Smith" in a total amount of $800.

User interface view 100A also includes a section 105 that lists "all transactions", which may include all of the user's transactions (e.g., displaying the transactions individually rather than grouped into pre-classified data sets). It is noted that summaries 102, 103, and 104 comprise a more efficient manner of displaying the transactions to the user for categorization. For example, the user need not look through the long list of transactions for like transactions. Given that many transactions may happen on different days, the conventional method of presenting transactions in a chronological order means that like transactions may not be (indeed often are not) adjacent in the list.

In one embodiment, a plurality of activity records (e.g., retrieved from financial accounts) are used to group a plurality of activities of a user into pre-classified data sets (summarized by summaries 102, 103, and 104). For example, a category of each activity may be predicted using a predictive model that is trained using historical activity records and historical category information provided by historical users with respect to the historical activity records). In certain embodiments, the predictive model may further be trained using historical user data (e.g., user profile information, such as users' profession, income, geographic location, and the like) associated with historical activity records. The predictive model may predict categories of a user's activities based on user data of the user. For example, users who work as ride-share or taxi drivers may be historically more likely to categorize trips to certain locations as business rather than personal, and so if the user's profile indicates that the user is a ride-share or taxi driver, this may impact predicted categories for the user's activities. In other words, a user's profile may affect the pre-classification results. Thus, different users may have unique pre-classification results based on their profiles, which further improves the experience of using interface 100A as compared to conventional methods.

Machine-learning algorithms enable computing systems to develop improved functionality without explicitly being programmed. Given a set of training data, a predictive model including machine-learning algorithms can generate and refine a function that predicts a target attribute for an instance based on other attributes of the instance. For example, a predictive model may be used by an application to classify a user's transactions as, e.g., business or personal, for the purpose of accurately calculating the user's business-related income and expenses. In such an example, the instance represents a transaction and the target attribute is the transaction's category or classification. The machine-learning model, in that case, can be trained using historical transaction records and associated classification information to predict the transaction's classification based on the transaction's other attributes, such as the transaction's description and amount.

A number of parameters may be used as input into the predictive model including a transaction amount, description, counterparty (or counterparties), and/or the like. The time at which the transaction occurred may also be input into the model to help improve the accuracy of the classification performed by the model. For example, if a user conducts a transaction (e.g., pays for lunch) during the weekend, it's more likely that the corresponding transaction is personal and not business related. However, if the same transaction occurs during the week for, it is more likely that the transaction is related to the user's business. To classify a given transaction, a transaction record associated with the transaction may be received from the user's financial institution. Information retrieved and/or derived from the transaction record may be provided as input to the predictive model to predict a category of the transaction.

Once a predicted category is determined for each activity, the activities are then grouped into pre-classified data sets based on predicted categories. Summaries 102, 103, and 104 are then provided to the user via user interface view 100A for efficient and organized categorization by the user. It is noted that the use of a predictive model is only included as one example of how activities may be grouped into pre-classified data sets, and that other methods of pre-classifying data may be employed without departing from the scope of the present disclosure.

Each of summaries 102, 103, and 104 has a control 112, 113, and 114 (e.g., illustrated in FIG. 1A as three vertical dots next to the "review" button) which, when selected, provides the user with an option to categorize all activities in the summarized pre-classified data set without reviewing each individual activity. For example, the user may be able to confirm the predicted category of all activities in the pre-classified data set or specify a different category for all activities in the pre-classified data set. If the user wishes to view all activities in the pre-classified data set, the user may select a user interface element (e.g., the "review" button in summaries 102, 103, and 104) to view all of the activities in the pre-classified data set. Alternatively, the user may categorize activities separately from the pre-classified data sets by individually reviewing and categorizing the activities (e.g., listed under the header "all transactions" in section 104 of user interface view 100A).

In some embodiments, summaries 102, 103, and 104 may be arranged in an order of relevance, efficiency, urgency, and/or based on a number of transactions in the pre-classified data set. For example, a pre-classified data set may be considered more relevant to a user if it has a predicted category that is commonly utilized by the user. A pre-classified data set may be considered to have a higher efficiency for categorization if it has a higher confidence score (e.g., determined by the predictive model based on a degree of similarity between historical activity records and activity records for which a category is predicted). A pre-classified data set may be considered to have a higher level of urgency for categorization based on predetermined rules that specify types of activities that should be categorized quickly (e.g., a rule may specify that it is urgent to categorize tax-related activities if a tax filing deadline is approaching). In other embodiments, summaries 102, 103, and 104 are arranged based on numbers of transactions in the pre-classified data sets summarized by summaries 102, 103, and 104. Because users may be performing categorization in a transient fashion (e.g., on their phones while waiting in a line or while riding in a cab), it may be valuable to present users with the largest pre-classified data sets (e.g., with the largest number of transactions) first in the interest of getting the most transactions classified given the users' short attention span.

Once a user has assigned a category to an activity or group of activities, the activity or group of activities will be categorized accordingly, and may then be used in other application processes (e.g., tax preparation, accounting, or the like) that involve categorized activities.

It is noted that summaries 102, 103, and 104 relate to pre-classified data sets comprising transactions. For example, user interface view 100A may be displayed when the user selects a "transactions" tab or control. The user may select other tabs or controls, such as "mileage" to display summaries of pre-classified data sets related to other types of activities, such as trips.

Figure 1B:
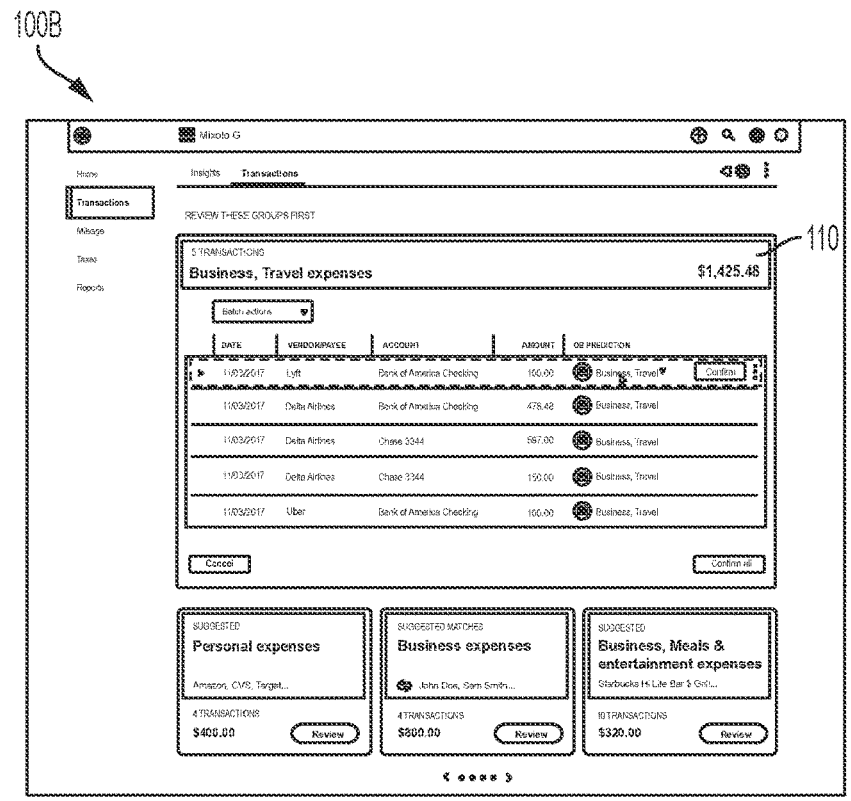

FIG. 1B depicts aspects of another example user interface view 100B for providing users with reduced data sets based on pre-classification of larger data sets. User interface view 100B comprises a screen that is presented to a user of a client device within an application accessed via a client device. For example, user interface view 100B may be a screen within a financial services application that is provided after the user selects the "review" button in summary 103 of user interface view 100A depicted in FIG. 1A.

User interface view 100B includes a pre-classified data set explorer 110 that lists all activities within a pre-classified data set that includes activities that are pre-classified as "business, travel expenses". Pre-classified data set explorer 110 lists attributes of each activity in the pre-classified data set, such as a data, vendor/payee, account, amount, and predicted category. Pre-classified data set explorer 110 includes a control that allows a user to "confirm all", which provides the user with the ability to confirm the predicted category of all activities in the pre-classified data set. Pre-classified data set explorer 110 also includes controls that allow the user to confirm the predicted category of individual activities or specify different categories for individual activities.

User interface view 100B may also suggest additional pre-classified data sets for review (e.g., via user interface elements such as "tiles" or "cards" at the bottom of the screen) to allow the user to easily navigate to other smart groups for review.

Figure 1C:
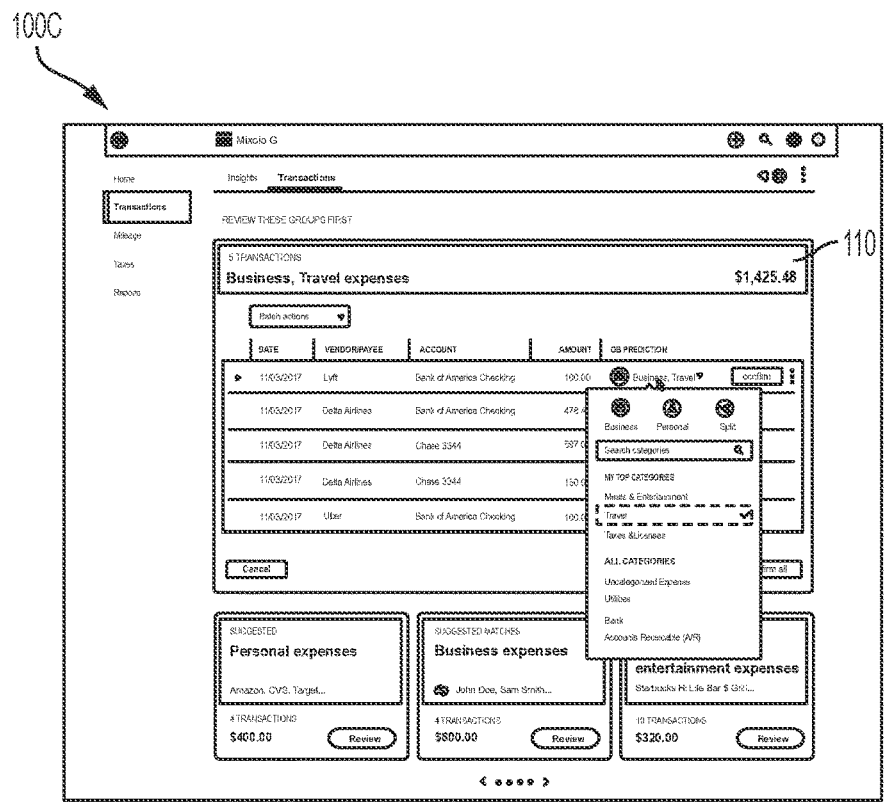

FIG. 1C depicts aspects of another example user interface view 100C for providing users with reduced data sets based on pre-classification of larger data sets. User interface view 100C comprises a screen that is presented to a user of a client device within an application accessed via the client device. For example, user interface view 100C may be a screen within a financial services application that is provided after the user selects a control to specify a different category for an activity within pre-classified data set explorer 110 of user interface view 100B depicted in FIG. 1B.

In user interface view 100C, pre-classified data set explorer 110 includes a control that allows the user to enter a category for an activity. The control may list the user's "top categories", which may be the categories that the user most frequently assigns to activities, and/or all available categories so that the user may select a category rather than type the name of a category. The category specified by the user via the control will be used to categorize the activity within the application.

The user interfaces described above with respect to FIGS. 1A-C allow for data related to activities to be presented to a user in a more organized, limited, and streamlined fashion as compared to conventional user interfaces, in which such data may be presented to a user in its entirety, often in an unorganized fashion. For example, conventional techniques may involve displaying all data related to activities in bulk to a user for review and categorization, such as in a list that is not organized or sorted based on classification. As such, techniques described herein for presenting particular types of data to users in limited pre-classified data sets, such as in summary form, allow users to review and provide input related to data in a more efficient manner than do conventional techniques. As above, by improving the efficiency and user experience generally, users may be more inclined to actually leverage the categorization feature provided by the application.

Figure 2A:
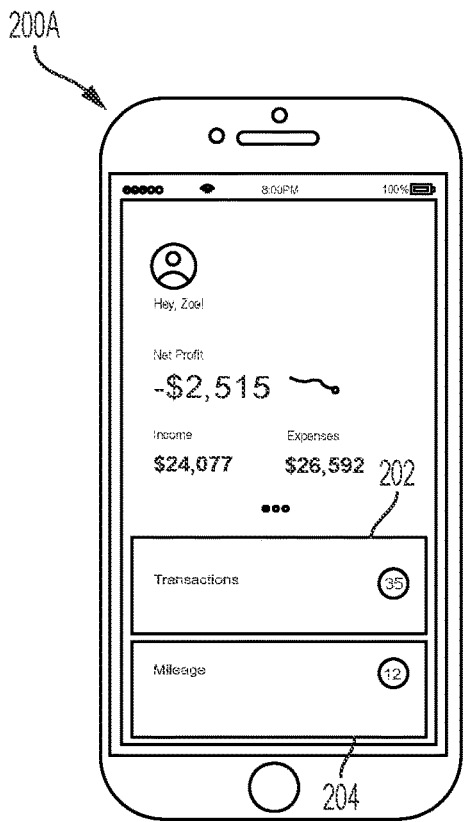
FIGS. 2A-H depict aspects of an example mobile user interface for providing users of mobile devices with reduced data sets based on pre-classification of larger data sets.

FIG. 2A depicts aspects of an example user interface view 200A for providing users of mobile devices with reduced data sets based on pre-classification of larger data sets. User interface view 200A comprises a screen that is presented to a user of a mobile device within an application accessed via the mobile device. For example, user interface view 200A may be a screen within a financial services application.

User interface view 200A includes controls 202 and 204 which, when selected (e.g., by touch input), launch views related to categorizing different types of activities (e.g., transactions or mileage). User interface view 200A also includes summary data related to the user's overall financial status (e.g., the user's net profit, income, and expenses).

Figure 2B:

FIG. 2B depicts aspects of another example user interface view 200B for providing users of mobile devices with reduced data sets based on pre-classification of larger data sets. User interface view 200B comprises a screen that is presented to a user of a mobile device within an application accessed via the mobile device. For example, user interface view 200B may be displayed when the user selects control 202 from user interface view 200A depicted in FIG. 2A.

User interface view 200B includes summaries 206 and 208 of pre-classified data sets comprising activities to be categorized by the user. Summary 206 summarizes a pre-classified data set including transactions that are the user's "greatest hits" (e.g., transactions with attributes that are most common for the user, such as transactions with a counterparty that appears frequently in the user's transaction records). Summary 206 includes a description of the pre-classified data set (e.g., "greatest hits") and a number of transactions that are included in the pre-classified data set (e.g., 32). In some embodiments, summary 206 may include a control that allows the user to assign a category to all transactions in the pre-classified data set without reviewing them individually.

Summary 208 summarizes a pre-classified data set including transactions that are the user's "big ticket items" (e.g., transactions with the highest amount spent or transactions with an amount that exceeds a threshold). Summary 208 includes a description of the pre-classified data set (e.g., "big ticket items") and a number of transactions that are included in the pre-classified data set (e.g., 5). In some embodiments, summary 208 may include a control that allows the user to assign a category to all transactions in the pre-classified data set without reviewing them individually.

User interface view 200B may include other information relevant to the user's transactions (e.g., the total amount the user spent on meals and entertainment in a particular month). Below summaries 206 and 208, user interface view 200B may list all pre-classified data sets comprising the user's transactions or all of the transactions individually. The user may be able to scroll user interface view 200B (e.g., by swiping) to view all of the pre-classified data sets or transactions.

Figure 2C:
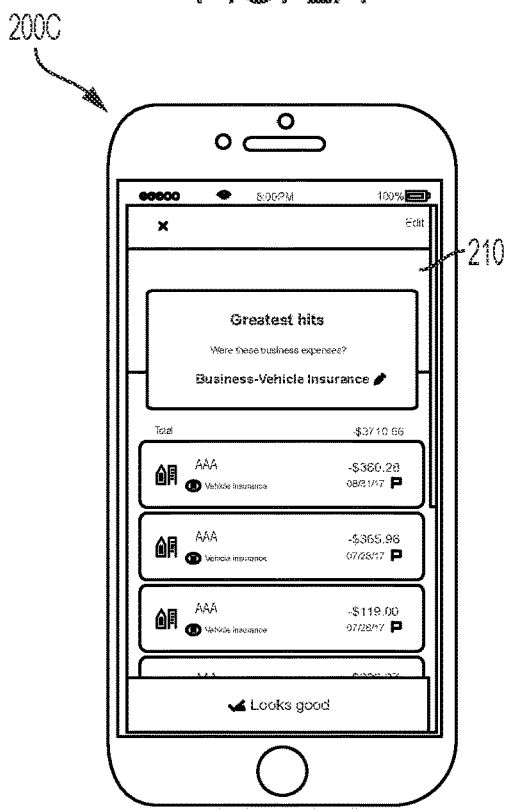

FIG. 2C depicts aspects of another example user interface view 200C for providing users of mobile devices with reduced data sets based on pre-classification of larger data sets. User interface view 200C comprises a screen that is presented to a user of a mobile device within an application accessed via the mobile device. For example, user interface view 200C may be displayed when the user selects summary 206 from user interface view 200B depicted in FIG. 2B.

User interface view 200C includes pre-classified data set explorer 210, which may list information related to a pre-classified data set. Pre-classified data set explorer 210 includes a description of the pre-classified data set (e.g., "greatest hits"), a predicted category of the transactions in the pre-classified data set (e.g., "business—vehicle insurance"), a total amount of the transactions in the pre-classified data set (e.g., -$3710.66), and a list of all transactions in the pre-classified data set. Pre-classified data set explorer 210 may further include a control that allows the user to approve the predicted category of all of the transactions together (e.g., a button with the text "looks good"), and a control that allows the user to edit the predicted category. The user may also be provided with controls that allow the user to individually categorize transactions in the pre-classified data set, such as by approving the predicted category or specifying a different category. In certain embodiments, the user may also be provided with a control that allows the user to provide additional detail related to the transactions, such as a purpose of the transactions.

Figure 2D:
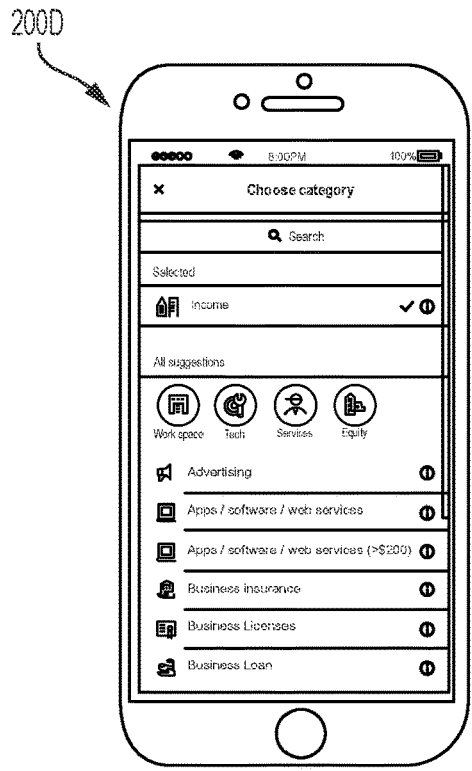

FIG. 2D depicts aspects of another example user interface view 200D for providing users of mobile devices with reduced data sets based on pre-classification of larger data sets. User interface view 200D comprises a screen that is presented to a user of a mobile device within an application accessed via the mobile device. For example, user interface view 200D may be displayed when the user selects a control to edit the category of the activities in user interface view 200C depicted in FIG. 2C.

User interface view 200D provides the user with a list of potential categories (e.g., "tech") and sub-categories (e.g., "apps/software/web services") to select. The user may select a category and/or sub-category that is listed, or may enter a different category in a text box. For example, user interface view 200D may allow the user to search for a category and/or sub-category and, in some embodiments, provide a new category and/or sub-category. Once the user has specified a category (which may or may not include a sub-category) for the transactions in the pre-classified data set through user interface view 200D, the selected category is assigned to the transactions in the pre-classified data set. In certain embodiments, the user may launch user interface view 200D for an individual transaction or for all transactions in a pre-classified data set together.

Figure 2E:
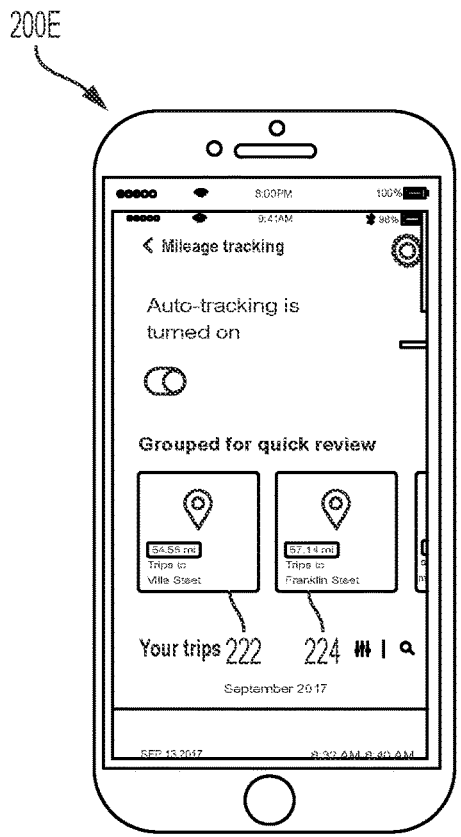

FIG. 2E depicts aspects of another example user interface view 200E for providing users of mobile devices with reduced data sets based on pre-classification of larger data sets. User interface view 200E comprises a screen that is presented to a user of a mobile device within an application accessed via the mobile device. For example, user interface view 200E may be displayed when the user selects control 204 from user interface view 200A depicted in FIG. 2A.

For example, user interface 200E may allow a user to enable a feature (e.g., "auto-tracking") of an application that makes use of a location tracking system, such a satellite-based positioning system (e.g., global positioning system (GPS), global navigation satellite system (GLONASS), or the like), associated with the mobile device to track the user's location for the purposes of classifying user activities such as trips.

Certain embodiments of the present disclosure involve training a predictive model based on historical data in order to pre-classify user activities (e.g., a trip having an origin location and a destination location). The predictive model may comprise a data model (e.g., a cluster model, linear model, neural network, or the like) that is trained using a set of input variables (e.g., historical trip records) and an output variable (e.g., historical classification data). Once trained, the predictive model may be used to predict an output (e.g., a predicted classification) based on input variables (e.g., a new trip record). Historical data may include, for example, historical trip records from a particular user or from a plurality of users. The trip records may include origin locations, destination locations, and time stamps. In some embodiments, at least a subset of the historical trip records may comprise user-provided data or "ground truth labels", such as classification data and/or descriptive text that is related to the trip records. For example, users may provide input through client devices that capture location data, the input including descriptions or classifications of locations (e.g., "home" or "work"), classifications of trips (e.g., "business" or "personal"), and the like.

User interface view 200E includes summaries 222 and 224 of pre-classified data sets comprising activities to be categorized by the user. Summary 222 summarizes a pre-classified data set including trips to a particular location (e.g., "villa street"). Summary 222 includes a description of the pre-classified data set (e.g., "trips to villa street") and a total number of miles that are included in the trips in the pre-classified data set (e.g., 54.56 miles). In certain embodiments, summary 222 may include a total number of trips included in the pre-classified data set instead of or in addition to the total number of miles. In some embodiments, summary 222 may include a control that allows the user to assign a category to all trips in the pre-classified data set without reviewing them individually.

Summary 224 summarizes a pre-classified data set including trips to a different particular location (e.g., "franklin street"). Summary 224 includes a description of the pre-classified data set (e.g., "trips to franklin street") and a total number of miles that are included in the trips in the pre-classified data set (e.g., 57.14 miles). In certain embodiments, summary 224 may include a total number of trips included in the pre-classified data set instead of or in addition to the total number of miles. In some embodiments, summary 224 may include a control that allows the user to assign a category to all trips in the pre-classified data set without reviewing them individually.

User interface view 200E may also include a control that allows a user to specify whether to auto-track the user's trips (e.g., turning on or off auto-tracking for the user's mileage). Below summaries 222 and 224, user interface view 200E may list all pre-classified data sets comprising the user's trips or all of the user's trips individually. The user may be able to scroll user interface view 200E (e.g., by swiping) to view all of the pre-classified data sets or trips.

Figure 2F:

FIG. 2F depicts aspects of another example user interface view 200F for providing users of mobile devices with reduced data sets based on pre-classification of larger data sets. User interface view 200F comprises a screen that is presented to a user of a mobile device within an application accessed via the mobile device. For example, user interface view 200F may be displayed when the user selects summary 222 from user interface view 200E depicted in FIG. 2E.

User interface view 200F includes pre-classified data set explorer 226, which may list information related to a pre-classified data set. Pre-classified data set explorer 226 includes a description of the pre-classified data set (e.g., "villa street"), a map and/or address related to the pre-classified data set, a total amount of a potential deduction based on the trips in the pre-classified data set (e.g., $16.36), and a list of all trips in the pre-classified data set. Pre-classified data set explorer 226 may further include a control that allows the user to assign a category to all of the trips together (e.g., mark all as "business" or "personal"), and, in some embodiments, may include a control that allows the user to specify a different category. The user may also be provided with controls that allow the user to individually categorize trips in the pre-classified data set. In certain embodiments, the user may also be provided with a control that allows the user to provide additional detail related to the trips, such as a purpose of the trips. The user may scroll (e.g., by swiping) in order to view all of the trips in the pre-classified data set.

Figure 2G:
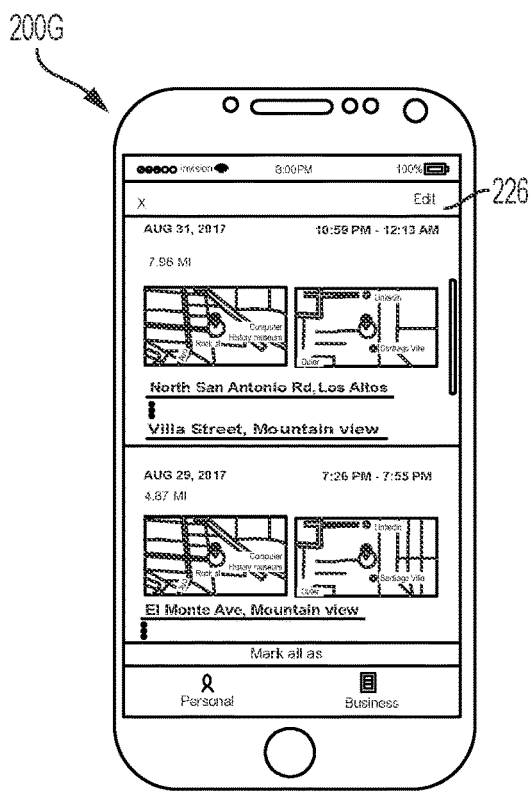

FIG. 2G depicts aspects of another example user interface view 200G for providing users of mobile devices with reduced data sets based on pre-classification of a larger data set. User interface view 200G comprises a screen that is presented to a user of a mobile device within an application accessed via the mobile device. For example, user interface view 200G may be displayed when the user scrolls down from user interface view 200F depicted in FIG. 2F.

User interface view 200G includes additional aspects of pre-classified data set explorer 226, described above with respect to FIG. 2F. Pre-classified data set explorer 226 includes a list of all trips in the pre-classified data set. Each trip listed in pre-classified data set explorer 226 may include a date, a time span of the trip, a mileage of the trip, an origin location of the trip, and a destination location of the trip. Each trip may also include a map showing the origin and/or destination locations of the trip.

Figure 2H:
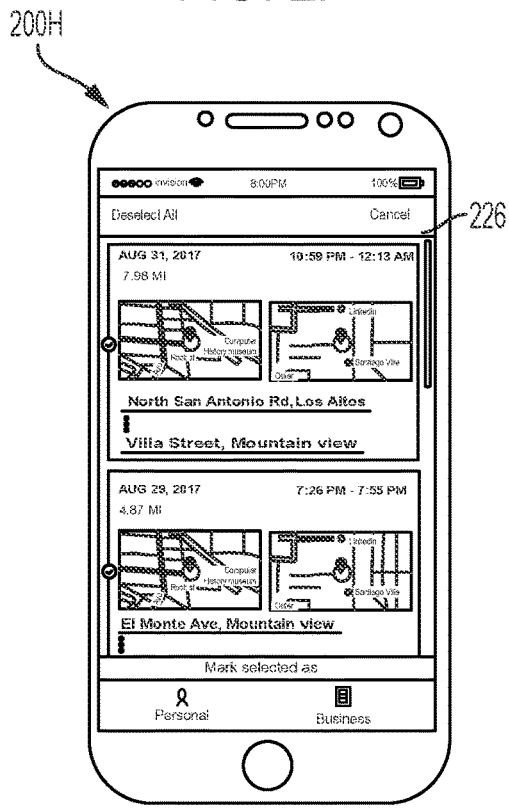

FIG. 2H depicts aspects of another example user interface view 200H for providing users of mobile devices with reduced data sets based on pre-classification of a larger data set. User interface view 200H comprises a screen that is presented to a user of a mobile device within an application accessed via the mobile device. For example, user interface view 200H may be displayed when the user selects a control to edit categories within user interface view 200F depicted in FIG. 2F.

User interface view 200H includes additional aspects of pre-classified data set explorer 226, described above with respect to FIGS. 2F and 2G. In user interface view 200H, each trip listed within pre-classified data set explorer 226 has a user interface element or bubble that, when selected (e.g., indicated by a check mark), allows the user to assign a category to that trip. For example, the user may select several individual trips using the checkboxes and then select a control to mark the selected individual trips as a particular category (e.g., business or personal). In alternative embodiments, the user may be provided with a control to specify a different category, such as through entering text in a text box.

It is noted that, while the embodiments described with respect to FIGS. 1A-C and FIGS. 2A-H include particular examples related to financial transactions and trips, techniques described herein may be utilized in any application in which user activities are categorized, and are not limited to financial or location contexts. Furthermore, it is noted that user interface elements described with respect to particular types of devices, such as mobile devices, may also be implemented on other types of devices.

The user interfaces described above with respect to FIGS. 2A-H allow for data related to activities to be presented to a user of a mobile device (e.g., which may have a limited display size) in a more organized, limited, and streamlined fashion as compared conventional user interfaces, in which such data may be presented to a user in its entirety, often in an unorganized form. Presenting activities to a user of a mobile device in pre-classified data sets within a user interface, particularly when displayed via summaries of pre-classified data sets, allows the user to review and provide input related to activities without excessive scrolling or straining to read large amounts of text on a small screen. Accordingly, efficiency may be substantially improved and the user's experience may be significantly enhanced by techniques described herein. As above, by improving the efficiency and user experience generally, users may be more inclined to actually leverage the categorization feature provided by the application.

Example Computer-Implemented Method

Figure 3:
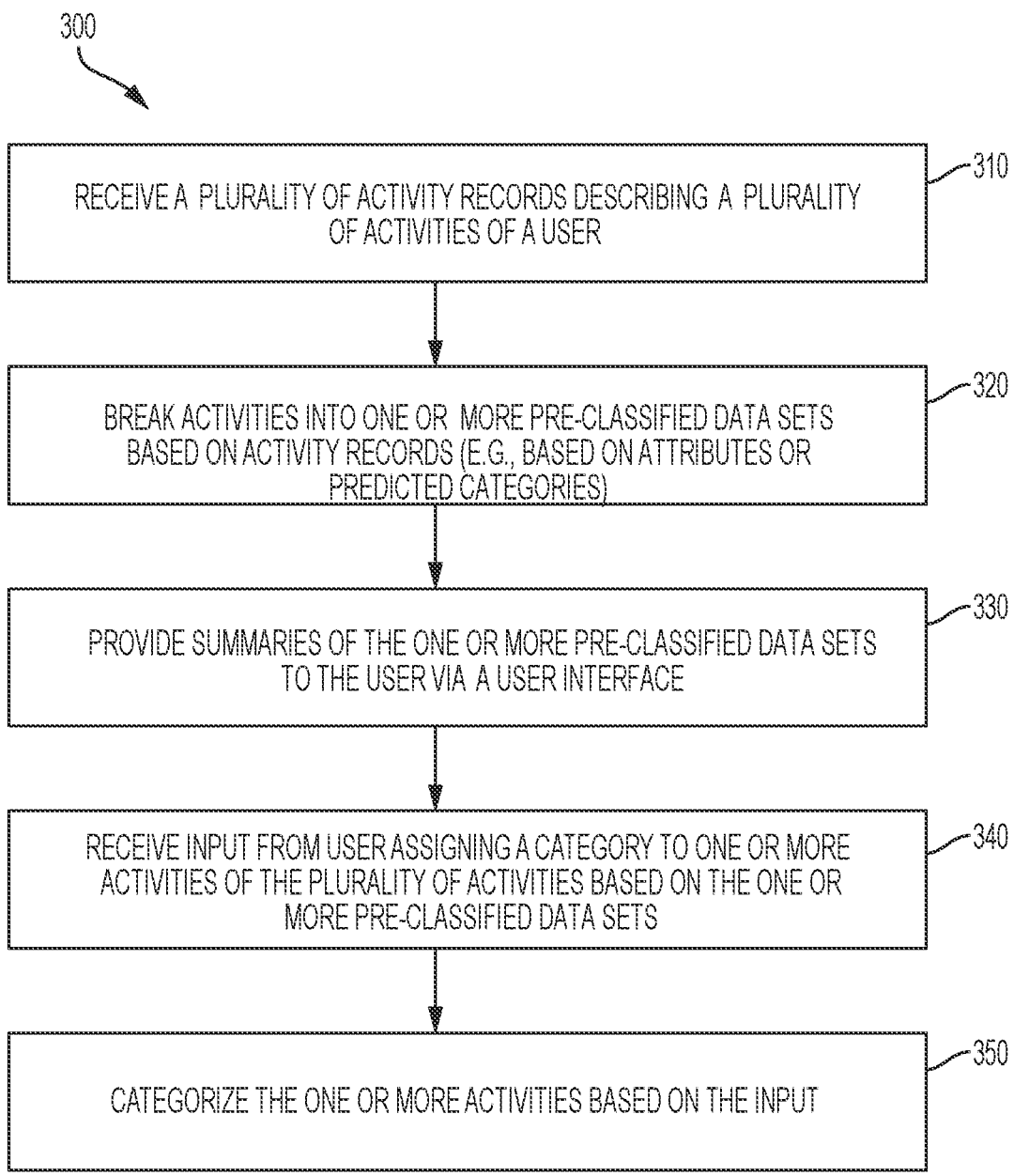
FIG. 3 depicts example operations for providing users with reduced data sets based on pre-classification of larger data sets.

FIG. 3 depicts example operations 300 for providing users with reduced data sets based on pre-classification of larger data sets. Operations 300 may, for example, be performed by a server that comprises a server-side portion of a client-server application (e.g., a financial services application). In another embodiment, operations 300 may be performed by a client device on which a user accesses a user interface.

Operations 300 begin at step 310, where a plurality of activity records describing a plurality of activities of a user are received. For example, the user's activities may be captured as activity records by a client device through which the user accesses the application, and the activity records may be provided to the server by the client device. The activity records may include attributes of the activities.

At step 320, the activities are divided into one or more pre-classified data sets (e.g., into smart buckets) based on the activity records, such as based on attributes or predicted categories. In one example, activities are grouped into pre-classified data sets based on attributes of the activities (e.g., trips that share a common destination location, transactions including an amount that exceeds a threshold, and/or the like).

In some embodiments, activities are grouped into pre-classified data sets based on predicted categories of the activities. For example, a predictive model that is trained using historical activity records along with historical category information may be used to predict a category for each activity based on the activity records, and all activities with a particular predicted category may be grouped together. In certain embodiments, activities may be grouped into pre-classified data sets based on a variety of factors (e.g., activities that share common attributes as well as predicted categories).

At step 330, summaries of the one or more pre-classified data sets are provided to the user via a user interface. For example, a user interface may include summaries of each pre-classified data set including information such as a description of the pre-classified data set, a number of activities in the pre-classified data set, and the like. A summary may, for example, be generated by analyzing a pre-classified data set to identify a number of activities in the pre-classified data set as well as one or more shared attributes (e.g., predicted category, common origin or destination location, common counterparty to a transaction, and/or the like). A description of a pre-classified data set may be based, for example, on an attribute that is shared by activities in the pre-classified data set.

At step 340, input is received from the user assigning a category to one or more activities of the plurality of activities based on the one or more pre-classified data sets. For example, the user may use one or more controls to confirm a predicted category of all activities in a pre-classified data set (e.g., by selecting a button labeled "confirm", or the like), specify a category for all activities in a pre-classified data set (e.g., by entering text in a text box, selecting a category from a list, or the like), specify a category for individual activities within the pre-classified data set, or the like.

In some embodiments, a user's confirmation of a predicted category or denial of the predicted category may be used as an active feedback for the predictive model in order to further improve the predictive model's performance overall, and also to generate a user-specific performance.

At step 350, the one or more activities are categorized based on the input. In some embodiments, the assigned categories are used in conjunction with the activity records to re-train the predictive model in order to improve future predictions.

In some embodiments of operations 300, a summary of a pre-classified data set includes a description of the pre-classified data set, a number of activities in the pre-classified data set, one or more descriptive terms associated with at least a subset of the activities in the pre-classified data set, and/or a control that, when selected, allows the user to view information about all of the activities in the pre-classified data set. In certain embodiments, the control, when selected, allows the user to view the information about all of the activities in the pre-classified data set by initiating the following operations: displaying attributes of each of the activities in the pre-classified data set; and providing the user with one or more controls for confirming the predicted category or assigning a different category to each of the activities.

Example Networking Environment

Figure 4:
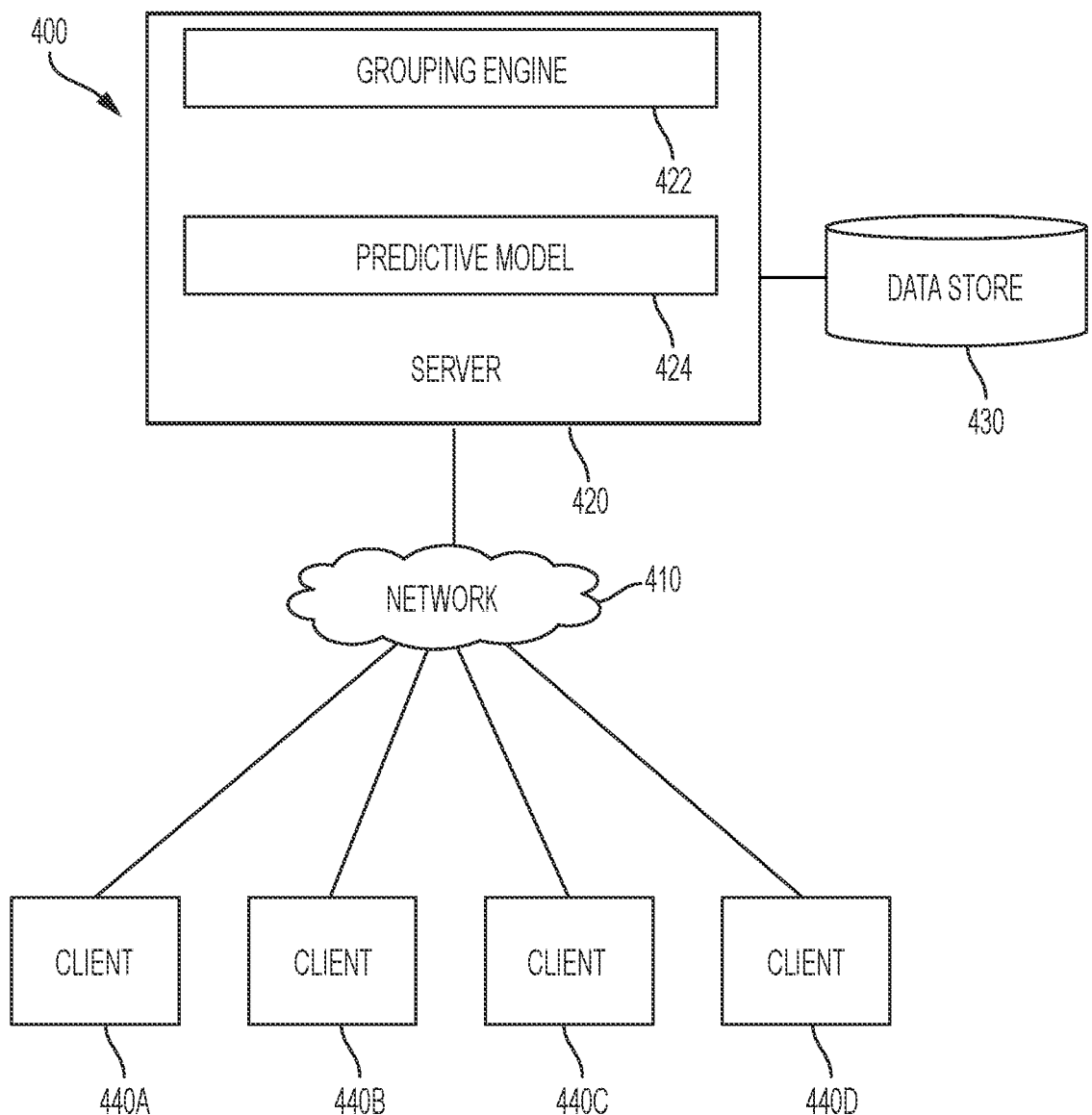
FIG. 4 depicts an example networking environment in which embodiments of the present disclosure may be implemented.

FIG. 4 depicts an example networking environment 400 in which embodiments of the present disclosure may be implemented.

Networking environment 400 comprises a server 420 with an associated data store 430 and a plurality of clients 440A-D, all of which are connected over a network 410, such as the Internet.

Server 420 may comprise a physical or virtual computing device, such as a server, desktop computer, laptop computer, virtual machine, or the like. Server 420 comprises a pre-classification engine 422, which may perform operations described herein for providing users with reduced data sets based on pre-classification of larger data sets (e.g., pre-classification engine 422 may group activities into pre-classified data sets based on activity records received from one of clients 440A-D, may provide (e.g., in cooperation with user interface (UI) rendering engine 426) smart group information to the client for display within a user interface, and may receive user input from the client regarding categories of the activities). It is contemplated that one or more components of server 420 may be located remotely and accessed via network 410.

Server 420 further comprises a predictive model 424, which may be trained using historical data (e.g., historical activity records and categories) to predict outputs (e.g., categories) based on inputs (e.g., activity records).

Server 420 further comprises a user interface (UI) rendering engine 426, which may render user interfaces (e.g., including pre-classified data sets) and provide the user interfaces to client devices (e.g., clients 440A-D) for display. In some embodiments, UI rendering engine 426 may retrieve client attributes (e.g., screen size, resolution, orientation, and the like) from clients 440A-D, and may make determinations about which user interfaces or user interface elements to render and display for particular clients based on the client attributes. In alternative embodiments, pre-classification engine 422, predictive model 424, and/or UI rendering engine 426 may reside on a client device on which a user accesses a user interface according to techniques described herein.

Data store 430 may comprise a data storage entity, such as a repository, database, virtual storage device, or the like. In some embodiments, data store 430 stores personal user data of users that operate clients 440A-D. In certain embodiments, data store 430 stores activity records, which may be retrieved by pre-classification engine 422 in order to group activities described by the activity records. While data store 430 is shown separately from server 420, it is noted that data store 430 may alternatively be part of server 120.

Clients 440A-D may comprise computing devices, such as mobile devices, laptop computers, tablets, or the like, and may be used to capture activity records for users, display user interfaces with pre-classified data set information, receive input from users assigning categories to activities based on pre-classified data sets, and the like. Clients 440A-D may comprise client-side components of a client-server application, such as a financial services application. In some embodiments, each of clients 440A-D is equipped with a location tracking system, such as a satellite positioning system.

Predictive model 424 may be trained based on historical activity records received from a variety of users, such as the users of clients 440A-D and/or from the user of client 440D (e.g., in conjunction with personal user data of the users retrieved from data store 430 based on user identifiers included in the historical activity records). Pre-classification engine 422 may receive activity records from a user, such as the user of client 440D. Pre-classification engine 422 may use predictive model 424 to predict a category of the activity described by the activity record. In some embodiments, pre-classification engine 422 also retrieves personal user data of the user from data store 430, and may use the personal user data of the user in the predictive process (e.g., to identify similarities with historical user data associated with historical activity records). In certain embodiments, pre-classification engine 422 groups activities into pre-classified data sets based on predicted categories and/or shared attributes in activity records.

Server 420 may provide information (e.g., including summary information) about the pre-classified data sets to the user via a user interface of client 440D (e.g., rendered by UI rendering engine 426 based on client attributes retrieved from client 440D), and the user may provide input via the user interface in order to assign categories to one or more activities based on the pre-classified data sets. Providing the user with limited, organized sets of data allows the user to more efficiently review and provide input related to the data, particularly on mobile devices with smaller screens. The user input may be provided by client 440D to server 430, which may categorize the one or more activities based on the input. In some embodiments, server 420 may re-train the predictive model based on the categories and the activity records of the one or more activities (and, in some embodiments, the user data of the user).

While certain functions are described with respect to particular components depicted in FIG. 4, it is noted that other arrangements are possible. Furthermore, certain components may alternatively be implemented as a plurality of local or remote components. For example, the functionality of server 420 may be distributed across a plurality of computing devices. Predictions made in accordance with techniques described herein may, in some instances, be stored by server 420 and/or data store 430 for later use (e.g., by pre-classification engine 422).

Figure 5:
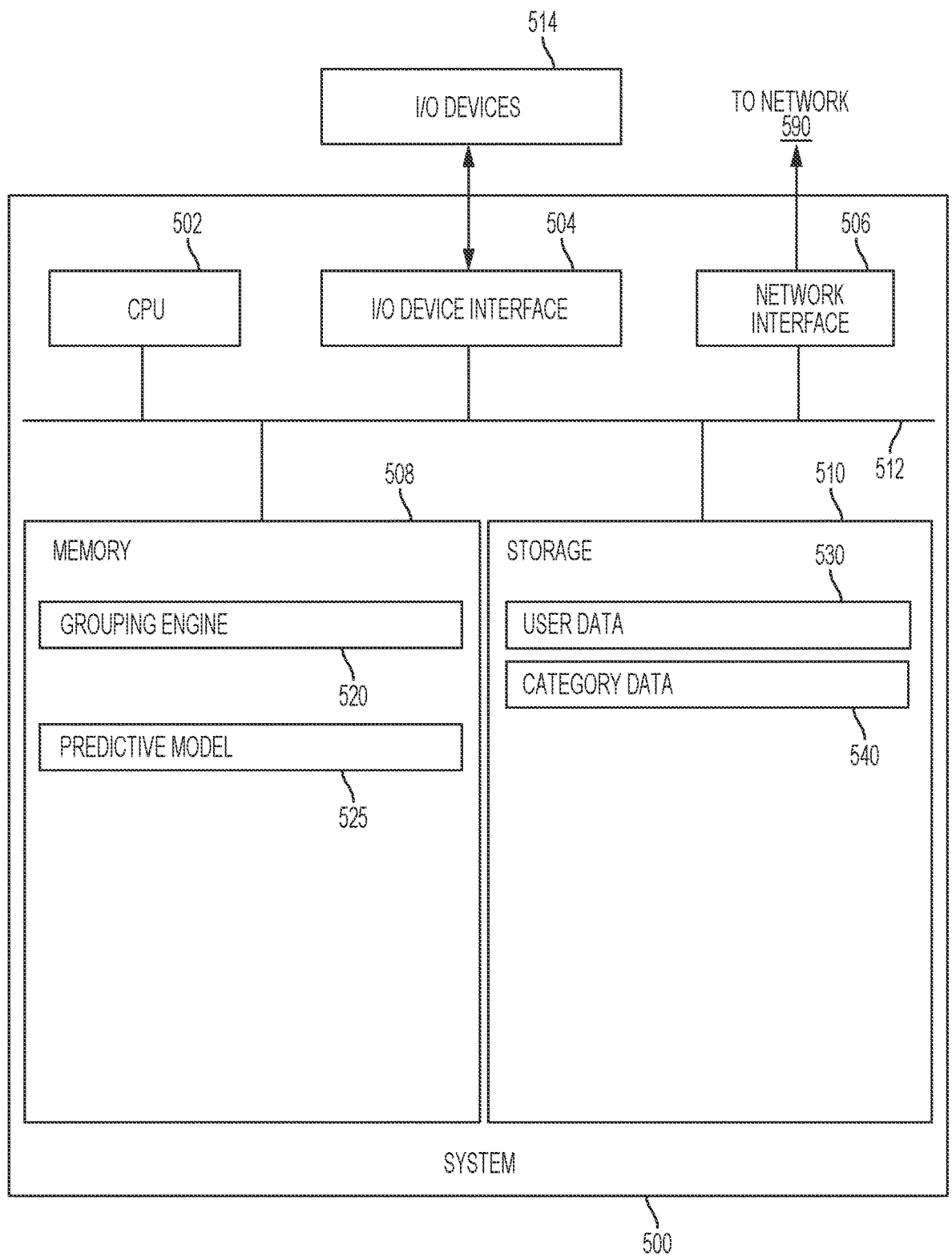
FIG. 5 depicts an example computing system with which embodiments of the present disclosure may be implemented.

FIG. 5 illustrates an example system 500 used for providing users with reduced data sets based on pre-classification of larger data sets. For example, system 500 may be representative of server 420 in FIG. 4.

As shown, system 500 includes a central processing unit (CPU) 502, one or more I/O device interfaces 504 that may allow for the connection of various I/O devices 514 (e.g., keyboards, displays, mouse devices, pen input, etc.) to the system 500, network interface 506, a memory 508, storage 510, and an interconnect 512. It is contemplated that one or more components of system 500 may be located remotely and accessed via network 590. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises user data 530, which may comprise personal user data (e.g., user profiles) associated with users of an application (e.g., a financial services application). User data 530 may also, in some embodiments, comprise activity records associated with users. Storage 510 further comprises category data 540, which may comprise categories previously assigned to activities (e.g., by input from users based on pre-classified data sets as described herein) along with associated activity records, user data, and/or additional descriptive data.

As shown, memory 508 includes a pre-classification engine 520, which may perform operations related to providing users with reduced data sets based on pre-classification of larger data sets (e.g., functionality described above with respect to FIGS. 1-4).

Memory 508 also includes a predictive model 525, which may be trained using historical data to predict outputs based on inputs according to techniques described herein. For example, pre-classification engine 520 may receive activity records from a user, group the activities described by the activity records into pre-classified data sets (e.g., based on shared attributes and/or predicted categories of the activities determined using predictive model 525), provide (e.g., in cooperation with UI rendering engine 528) information about the pre-classified data sets to the user via a user interface of a client device, and receive input from the user that assigns categories to one or more of the activities based on the pre-classified data sets.

Memory 508 also include a user interface (UI) rendering engine 528, which may render user interfaces for display on a particular client, such as user interfaces comprising pre-classified data sets. In certain embodiments, UI rendering engine 528 may tailor a user interface for a particular client based on client attributes retrieved from the client, such as screen size, resolution, orientation, and the like.

In some embodiments, pre-classification engine 520 may access user data 530 in order to retrieve personal user data of the user to use in grouping activities (e.g., in the process of predicting a category or identifying shared attributes). Pre-classification engine 520 in memory 508 may communicate with other devices (e.g., clients and remote data stores) over a network 590 through network interface 506 (e.g., in order to receive activity records, retrieve personal user data, provide pre-classified data set information (e.g., in cooperation with UI rendering engine 528), receive user input, and the like). In some embodiments, upon receiving user input assigning a category to one or more activities, pre-classification engine 520 may store the category and associated trip records as category data 540 in storage 510, and category data 540 may be used to continuously re-train predictive model 525 as described herein.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A developer interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for displaying reduced data sets based on pre-classification of a larger data set in a user interface, comprising:
   receiving a plurality of activity records describing a plurality of activities associated with a user;
   grouping the plurality of activities into one or more pre-classified data sets based on the plurality of activity records;
   providing the user with a summary of a pre-classified data set of the one or more pre-classified data sets via a user interface;
   providing the user, via the user interface, with a user interface element that allows the user to provide input related to the pre-classified data set based on the summary; and
   receiving input from the user via the user interface, wherein the input relates to the pre-classified data set.

2. The computer-implemented method of claim 1, wherein grouping the plurality of activities into the one or more pre-classified data sets based on the plurality of activity records comprises:
   identifying an attribute that is shared by a subset of the plurality of activity records; and
   assigning activities described by the subset of the plurality of activity records to a pre-classified data set based on the attribute.

3. The computer-implemented method of claim 1, wherein grouping the plurality of activities into the one or more pre-classified data sets based on the plurality of activity records comprises:
   using a predictive model to determine a predicted category of each of the plurality of activities, wherein the plurality of activity records are provided as input to the predictive model, and wherein the predictive model has been trained using historical activity records associated with categories to predict a category based on an activity record; and
   grouping the plurality of activities into the one or more pre-classified data sets based on the predicted category of each of the plurality of activities.

4. The computer-implemented method of claim 3, wherein providing the user with the summary of the pre-classified data set via the user interface comprises: displaying, within the user interface:
   a description of the pre-classified data set;
   a number of activities in the pre-classified data set;
   one or more descriptive terms associated with at least a subset of the activities in the pre-classified data set; and
   a control that, when selected, allows the user to view information about all of the activities in the pre-classified data set.

5. The computer-implemented method of claim 4, wherein receiving the input from the user via the user interface comprises: receiving a confirmation from the user that all of the activities in the pre-classified data set belong to the predicted category associated with the pre-classified data set.

6. The computer-implemented method of claim 4, wherein the control, when selected, allows the user to view the information about all of the activities in the pre-classified data set by initiating the following operations:
   displaying attributes of each of the activities in the pre-classified data set; and
   providing the user with one or more controls for confirming the predicted category or assigning a different category to each of the activities.

7. The computer-implemented method of claim 1, wherein the plurality of activities associated with the user comprise one or more trips, wherein each of the one or more trips comprises an origin location and a destination location, and wherein grouping the plurality of activities into the one or more pre-classified data sets based on the plurality of activity records comprises:
   determining that a subset of the one or more trips shares a common origin location or destination location; and
   grouping the subset of the one or more trips into a pre-classified data set based on the common origin location or destination location.

8. The computer-implemented method of claim 1, wherein the plurality of activities associated with the user comprise one or more transactions, wherein each of the one or more transactions comprises an amount, and wherein grouping the plurality of activities into the one or more pre-classified data sets based on the plurality of activity records comprises:
   determining that a subset of the one or more transactions comprise amounts that exceed a threshold; and
   grouping the subset of the one or more transactions into a pre-classified data set based on the amounts exceeding the threshold.

9. A computer-implemented user interface for displaying reduced data sets based on pre-classification of a larger data set, wherein the computer-implemented user interface is configured to display:
   a description of a pre-classified data set, the pre-classified data set comprising activities of a user that share a common attribute;
   a number of the activities in the pre-classified data set;
   one or more descriptive terms associated with at least a subset of the activities in the pre-classified data set;
   a first control that, when selected, allows the user to view information about all of the activities in the pre-classified data set; and
   a second control that, when selected, allows the user to provide input related to the activities in the pre-classified data set.

10. The computer-implemented user interface of claim 9, wherein the pre-classified data set is generated by:
- using a predictive model to determine a predicted category of each of the activities of the user, wherein a plurality of activity records associated with the activities are provided as input to the predictive model, and wherein the predictive model has been trained using historical activity records associated with categories to predict a category based on an activity record; and
- grouping the activities into the pre-classified data set based on the activities sharing a predicted category.

11. The computer-implemented user interface of claim 9, wherein the activities of the user comprise one or more trips, wherein each of the one or more trips comprises an origin location and a destination location, and wherein the pre-classified data set is generated by:
- determining that the one or more trips share a common origin location or destination location; and
- grouping the one or more trips into the pre-classified data set based on the common origin location or destination location.

12. The computer-implemented user interface of claim 9, wherein the activities of the user comprise one or more transactions, wherein each of the one or more transactions comprises an amount, and wherein the pre-classified data set is generated by:
- determining that the one or more transactions comprise amounts that exceed a threshold; and
- grouping the one or more transactions into the pre-classified data set based on the amounts exceeding the threshold.

13. A system, comprising: one or more processors; and a non-transitory computer-readable medium comprising instructions that, when executed by the one or more processors, cause the one or more processors to perform an operation for displaying reduced data sets based on pre-classification of a larger data set in a user interface, the operation comprising:
- receiving a plurality of activity records describing a plurality of activities associated with a user;
- grouping the plurality of activities into one or more pre-classified data sets based on the plurality of activity records;
- providing the user with a summary of a pre-classified data set of the one or more pre-classified data sets via a user interface;
- providing the user, via the user interface, with a user interface element that allows the user to provide input related to the pre-classified data set based on the summary; and
- receiving input from the user via the user interface, wherein the input relates to the pre-classified data set.

14. The system of claim 13, wherein grouping the plurality of activities into the one or more pre-classified data sets based on the plurality of activity records comprises:
- identifying an attribute that is shared by a subset of the plurality of activity records; and
- assigning activities described by the subset of the plurality of activity records to a pre-classified data set based on the attribute.

15. The system of claim 13, wherein grouping the plurality of activities into the one or more pre-classified data sets based on the plurality of activity records comprises:
- using a predictive model to determine a predicted category of each of the plurality of activities, wherein the plurality of activity records are provided as input to the predictive model, wherein a plurality of activity records associated with the plurality of activities are provided as input to the predictive model, and wherein the predictive model has been trained using historical activity records associated with categories to predict a category based on an activity record; and
- grouping the plurality of activities into the one or more pre-classified data sets based on the predicted category of each of the plurality of activities.

16. The system of claim 15, wherein providing the user with the summary of the pre-classified data set via the user interface comprises: displaying, within the user interface:
- a description of the pre-classified data set;
- a number of activities in the pre-classified data set;
- one or more descriptive terms associated with at least a subset of the activities in the pre-classified data set; and
- a control that, when selected, allows the user to view information about all of the activities in the pre-classified data set.

17. The system of claim 16, wherein receiving the input from the user via the user interface comprises: receiving a confirmation from the user that all of the activities in the pre-classified data set belong to the predicted category associated with the pre-classified data set.

18. The system of claim 16, wherein the control, when selected, allows the user to view the information about all of the activities in the pre-classified data set by initiating the following operations:
- displaying attributes of each of the activities in the pre-classified data set; and
- providing the user with one or more controls for confirming the predicted category or assigning a different category to each of the activities.

19. The system of claim 13, wherein the plurality of activities associated with the user comprise one or more trips, wherein each of the one or more trips comprises an origin location and a destination location, and wherein grouping the plurality of activities into the one or more pre-classified data sets based on the plurality of activity records comprises:
- determining that a subset of the one or more trips shares a common origin location or destination location; and
- grouping the subset of the one or more trips into a pre-classified data set based on the common origin location or destination location.

20. The system of claim 13, wherein the plurality of activities associated with the user comprise one or more transactions, wherein each of the one or more transactions comprises an amount, and wherein grouping the plurality of activities into the one or more pre-classified data sets based on the plurality of activity records comprises:
- determining that a subset of the one or more transactions comprise amounts that exceed a threshold; and
- grouping the subset of the one or more transactions into a pre-classified data set based on the amounts exceeding the threshold.

* * * * *